United States Patent
Hiramatsu

(10) Patent No.: US 10,580,082 B2
(45) Date of Patent: Mar. 3, 2020

(54) FLOW GENERATING PROGRAM, FLOW GENERATING METHOD, AND FLOW GENERATING DEVICE

(71) Applicant: FUJITSU LIMITED, Kawasaki-shi, Kanagawa (JP)

(72) Inventor: Junya Hiramatsu, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 302 days.

(21) Appl. No.: 15/440,498

(22) Filed: Feb. 23, 2017

(65) Prior Publication Data
US 2017/0316509 A1    Nov. 2, 2017

(30) Foreign Application Priority Data
Apr. 28, 2016    (JP) ................ 2016-091016

(51) Int. Cl.
*G06Q 40/00*    (2012.01)
*G06Q 40/08*    (2012.01)

(52) U.S. Cl.
CPC .................... *G06Q 40/08* (2013.01)

(58) Field of Classification Search
CPC ............ G06Q 30/02; G06Q 30/0255; G06Q 30/0269; G06Q 30/0254; G06N 99/005; G06N 7/005; G06N 5/04
See application file for complete search history.

(56) References Cited

U.S. PATENT DOCUMENTS

| | | | | |
|---|---|---|---|---|
| 6,920,453 | B2* | 7/2005 | Mannila | G06F 17/15 |
| 2005/0283680 | A1* | 12/2005 | Kobayashi | G06F 11/3636 |
| | | | | 714/39 |

(Continued)

FOREIGN PATENT DOCUMENTS

| | | |
|---|---|---|
| JP | 2010-20634 A | 1/2010 |
| JP | 2010-271806 A | 12/2010 |
| WO | 2013/153629 A1 | 10/2013 |

OTHER PUBLICATIONS

Lauri Lahti, Apriori algorithm, www.cis.hut.fi/Opinnot/T-61.6020/2008/apriori.pdf, Dec. 3, 2008 (Year: 2008).*

(Continued)

*Primary Examiner* — Mike Anderson
(74) *Attorney, Agent, or Firm* — Westerman, Hattori, Daniels & Adrian, LLP; John P. Kong

(57) ABSTRACT

A flow generating method includes steps of; first identifying, from a plurality of occurrence events recorded as log data, numbers of occurrences of transitions for respective pairs of a transition source and destination occurrence events; second identifying occurrence order patterns and numbers of occurrences for the respective occurrence order patterns, for each of a plurality of occurrence event groups which includes two or more pairs selected in a descending order of the number of occurrences and has a different number of the occurrence events; calculating a degree of concentration and a degree of inequality to an average value of a distribution of the numbers of occurrences for the respective identified occurrence order patterns; and generating a flow of the occurrence events based on an occurrence event group in which the degree of inequality is greater than or equal to a first threshold and the degree of concentration is the lowest.

6 Claims, 15 Drawing Sheets

(56) References Cited

U.S. PATENT DOCUMENTS

2012/0054246 A1* 3/2012 Fischer .................. G06Q 10/06
707/793
2013/0030761 A1* 1/2013 Lakshminarayan .........................
G06K 9/6219
702/179
2016/0037275 A1* 2/2016 Drullinger ........... H04R 29/001
381/59

OTHER PUBLICATIONS

Vasa, Comparative Analysis of Evolving Software Systems Using the Gini Coefficient, 2009 (Year: 2009).*

* cited by examiner

FIG. 4

| ID | TIME STAMP | EVENT |
|---|---|---|
| 001 | 00 : 00 | Case I |
| 001 | 00 : 01 | Case A |
| 001 | 00 : 02 | Case B |
| ... | ... | ... |
| 002 | 01 : 00 | Case A |
| 002 | 01 : 01 | Case B |
| 002 | 00 : 02 | Case I |
| ... | ... | ... |

FIG. 5

PATH DATA

| Path | Count |
|---|---|
| I→A→B→C→D→E→F→G→H | 100 |
| A→B→I→C→D→F→E→G→H | 10 |
| A→B→I→C→E→D→F→G→H | 10 |
| A→B→C→I→E→F→D→G→H | 10 |
| A→B→C→F→D→I→E→G→H | 10 |
| A→B→C→I→F→E→D→G→H | 10 |
| A→B→D→C→E→F→G→I→H | 100 |
| A→B→D→C→I→F→E→G→H | 10 |
| A→B→D→E→C→F→I→G→H | 100 |
| A→I→B→D→E→F→C→G→H | 100 |
| A→B→I→D→F→C→E→G→H | 10 |
| A→B→I→D→F→E→C→G→H | 10 |
| A→B→E→I→C→D→F→G→H | 10 |
| A→B→E→I→C→F→D→G→H | 10 |
| A→B→E→I→D→C→F→G→H | 10 |
| A→B→E→I→D→F→C→G→H | 10 |
| A→B→I→E→F→C→D→G→H | 10 |
| A→B→I→E→F→D→C→G→H | 10 |
| A→B→I→F→C→D→E→G→H | 10 |
| A→B→I→F→C→E→D→G→H | 10 |
| A→B→F→D→C→E→G→H→I | 10 |
| A→B→F→D→E→C→G→H→I | 10 |
| A→B→F→E→C→D→G→H→I | 10 |
| A→B→F→E→D→C→G→H→I | 10 |

TOTAL: 600

FIG. 6

| START \ END | END Σ=T(START) | A | B | C | D | E | F | G | H | I | FINAL_STATE |
|---|---|---|---|---|---|---|---|---|---|---|---|
| START Σ=T(END) | 6000 | 600 | 600 | 600 | 600 | 600 | 600 | 600 | 600 | 600 | 600 |
| INITIAL_STATE | 600 | 500 | 0 | 0 | 0 | 0 | 0 | 0 | 0 | 100 | 0 |
| A | 600 | 0 | 500 | 0 | 0 | 0 | 0 | 0 | 0 | 100 | 0 |
| B | 600 | 0 | 0 | 130 | 310 | 40 | 40 | 0 | 0 | 80 | 0 |
| C | 600 | 0 | 0 | 0 | 150 | 140 | 130 | 150 | 0 | 30 | 0 |
| D | 600 | 0 | 0 | 150 | 0 | 320 | 60 | 60 | 0 | 10 | 0 |
| E | 600 | 0 | 0 | 130 | 40 | 0 | 330 | 60 | 0 | 40 | 0 |
| F | 600 | 0 | 0 | 150 | 60 | 60 | 0 | 230 | 0 | 100 | 0 |
| G | 600 | 0 | 0 | 0 | 0 | 0 | 0 | 0 | 500 | 100 | 0 |
| H | 600 | 0 | 0 | 0 | 0 | 0 | 0 | 0 | 0 | 40 | 560 |
| I | 600 | 100 | 100 | 40 | 40 | 40 | 40 | 100 | 100 | 0 | 40 |

FIG. 11

PATH DATA

IABDE AIBDE ABIDE ABDIE ABDEI   EACH 10 ROUTES
IADBE AIDBE ADIBE ADBIE ADBEI   EACH 10 ROUTES
IABCDE AIBCDE ABICDE ABCIDE ABCDIE ABCDEI   EACH 5 ROUTES
IADCBE AIDCBE ADICBE ADCIBE ADCBIE ADCBEI   EACH 5 ROUTES
IACE, AICE, ACIE, ACEI   EACH 5 ROUTES
TOTAL 180 ROUTES

KURTOSIS AND GINI COEFFICIENT AT EACH STEP

FIRST STEP
    AE: 180   KURTOSIS NOT CALCULATED
SECOND STEP
    ABE: 160, AE: 20
    KURTOSIS: 4.125, GINI COEFFICIENT: 0.8
THIRD STEP
    ABDE: 80, ADBE: 80, AE: 20
    KURTOSIS: -0.75, GINI COEFFICIENT: 0.6
FOURTH STEP
    ABDE: 50, ADBE: 50, ABCDE: 30, ADCBE: 30, ACE: 20
    KURTOSIS: -1.04,  GINI COEFFICIENT: 0.725
FIFTH STEP
    EACH ROUTE INDICATED ABOVE
    KURTOSIS: -1.02, GINI COEFFICIENT: 0.075

FLOW GENERATING PROGRAM, FLOW GENERATING METHOD, AND FLOW GENERATING DEVICE

CROSS-REFERENCE TO RELATED APPLICATION

This application is based upon and claims the benefit of priority of the prior Japanese Patent Application No. 2016-091016, filed on Apr. 28, 2016, the entire contents of which are incorporated herein by reference.

FIELD

The embodiments discussed herein are related to a flow generating program, a flow generating method, and a flow generating device.

BACKGROUND

In recent years, in generating an operation flow diagram indicating the flow of events performed by an operation system, an operation flow diagram is generated based on log data output from the operation system, and the operation status of the operation system is analyzed in accordance with the generated operation flow diagram.

A related art has proposed a technique in which events carried out in parallel independently without any causal relationship between an originating event and a resulting event are detected as an apparent transition (see, for example, Japanese Laid-open Patent Publication No. 2010-271806).

A technique that automatically detects an irrelevant event that is not related to an operation and deletes the irrelevant event from an operation flow has been proposed (see, for example, Japanese Laid-open Patent Publication No. 2010-020634). Further, a technique that reduces the load on an operation system and generates an operation process model with an optimal granularity has been used (see, for example, International Publication Pamphlet No. WO2013/153629).

An increase in the number of events stored as log data results in a complex operation flow diagram, because a plurality of paths are included in the generated operation flow. Thus, if events are carried out in parallel independently without any causal relationship between the events, an irrelevant event that is not related to an operation, and the like are excluded from an operation flow diagram, and the operation flow diagram will be simplified.

On the other hand, exclusion of a particular event from a path included in an operation flow diagram may cause difficulty in subsequent analysis performed in accordance with the operation flow diagram. In such a case, it is not preferable to exclude a particular event (an occurrence event) from a path of the operation flow diagram.

As one aspect, the present disclosure intends to suppress exclusion of a particular occurrence event from a flow path.

SUMMARY

According to an aspect of the invention, a flow generating method includes steps of: first identifying, from information of a plurality of occurrence events recorded as log data of an information processing system, numbers of occurrences of transitions for respective pairs of a transition source occurrence event and a transition destination occurrence event; second identifying occurrence order patterns and numbers of occurrences for the respective occurrence order patterns, for each of a plurality of occurrence event groups which includes two or more pairs selected in a descending order of the number of occurrences and has a different number of the occurrence events; calculating a degree of concentration and a degree of inequality to an average value of a distribution of the numbers of occurrences for the respective identified occurrence order patterns; and generating a flow of the occurrence events based on an occurrence event group in which the degree of inequality is greater than or equal to a first threshold and the degree of concentration is the lowest.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of log data;

FIG. 5 is a diagram illustrating an example of path data;

FIG. 6 is a diagram illustrating an example of an inter-event transition table;

FIG. 11 is a diagram illustrating paths, kurtosis, and Gini coefficients in another example;

DESCRIPTION OF EMBODIMENTS

Figure 1:
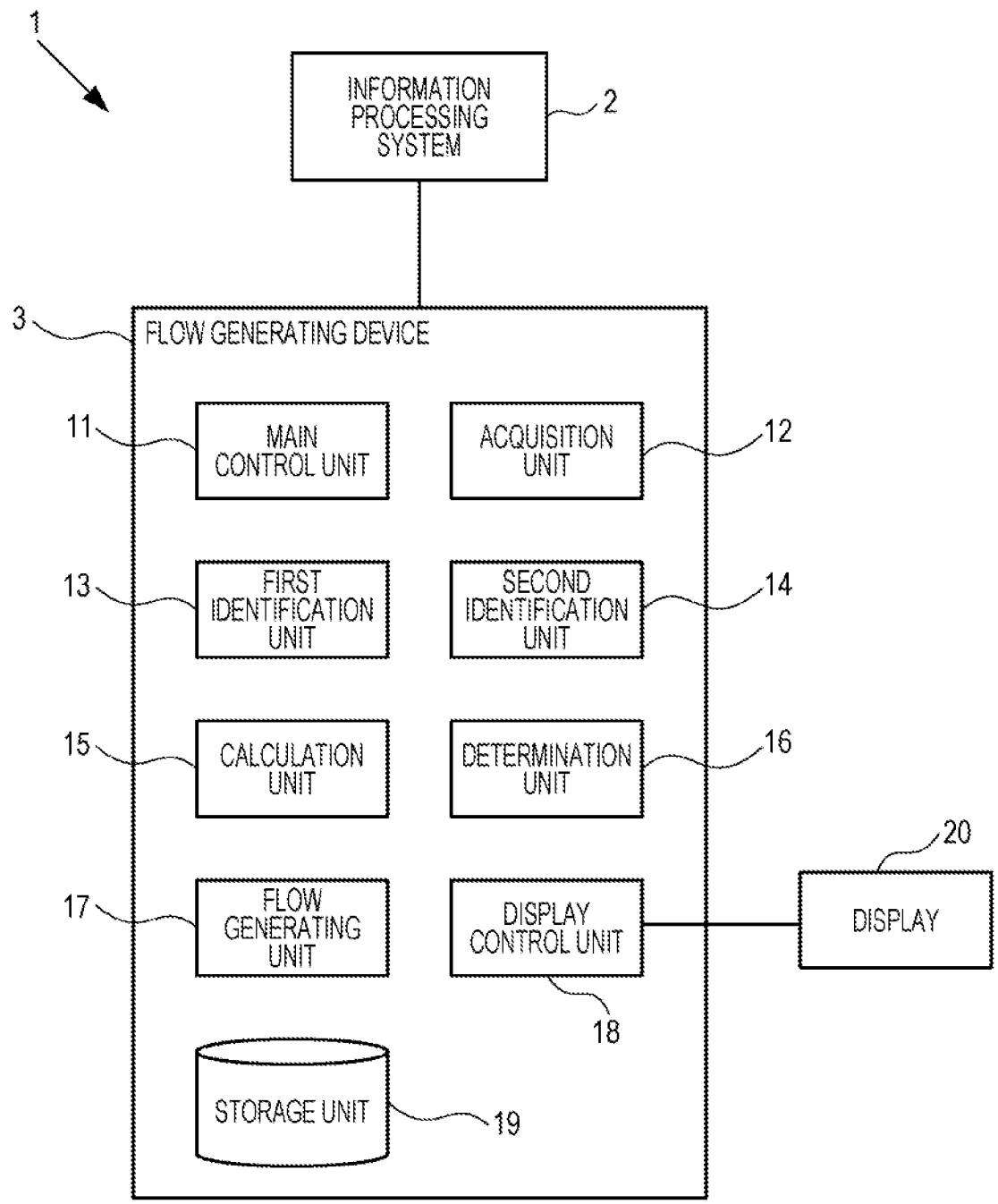
FIG. 1 is a diagram illustrating an example of a system of an embodiment.

An embodiment will be described below with reference to the drawings. FIG. 1 illustrates system 1 of the embodiment. In system 1, an information processing system 2 and a flow generating device 3 are communicably connected.

The information processing system 2 is a system that performs a predetermined operation, for example. The information processing system 2 may be a system including one or more servers, storage components, or the like. The information processing system 2 stores data regarding an event (an occurrence event) occurring in the information processing system 2 (hereafter, referred to as log data) in a storage component or the like, for example.

The flow generating device 3 acquires log data stored in the information processing system 2 and generates an operation flow that represents a flow of an occurrence event (hereafter, referred to as event) based on the acquired log data. An operation flow is an example of a flow. Based on the generated operation flow, for example, it is possible to analyze the current system for improving operations, transferring a system, or the like.

For example, based on evidence of an operation flow generated by the flow generating device 3, the device that performs the analysis described above is able to determine whether or not a predetermined operation process has been performed normally. Further, when detecting an irregular operation flow, the device described above is able to analyze the difference between the irregular operation flow and an expected operation flow.

The flow generating device 3 includes a main control unit 11, an acquisition unit 12, a first identification unit 13, a second identification unit 14, a calculation unit 15, a determination unit 16, a flow generating unit 17, a display control unit 18, and a storage unit 19.

The main control unit 11 performs various control of the flow generating device 3. The acquisition unit 12 acquires log data from the information processing system 1. Information concerning events described above is recorded in the acquired log data.

An operation flow of the embodiment represents the correspondence between events. The first identification unit 13 identifies the number of occurrences of transitions for each pair of a transition source event and a transition destination event based on log data.

For example, when information indicating that, after an event, other events are performed a predetermined number of times is recorded as log data, the first identification unit 13 identifies the number of occurrences of transitions for a pair of a transition source event and a transition destination event.

The second identification unit 14 selects pairs of a transition source event and a transition destination event in descending order of the number of occurrences of transitions in a pair as identified by the first identification unit 13 and generates an event group including two or more selected pairs.

An event group is incremented with events one by one. For an event group including an added event, the second identification unit 14 identifies an occurrence order pattern of events included in the event group and the number of occurrences for the occurrence order pattern. An event group is an example of an occurrence event group.

The calculation unit 15 performs a predetermined calculation to calculate kurtosis and a Gini coefficient with respect to the number of occurrences in the occurrence order pattern identified by the second identification unit 14. Kurtosis is an example of the degree of concentration to an average value of a distribution of the number of occurrences for the occurrence order pattern, and a Gini coefficient is an example of the degree of inequality.

The determination unit 16 performs various types of determination. The flow generating unit 17 generates an operation flow based on a determination result of the determination unit 16. The flow generating unit 17 creates an operation flow diagram for visualizing the generated operation flow. The storage unit 19 stores various types of information. The display control unit 18 performs control so as to display the operation flow diagram created by the flow generating unit 17 on the display 20.

Example of Operation Flow Diagram

Figure 2:
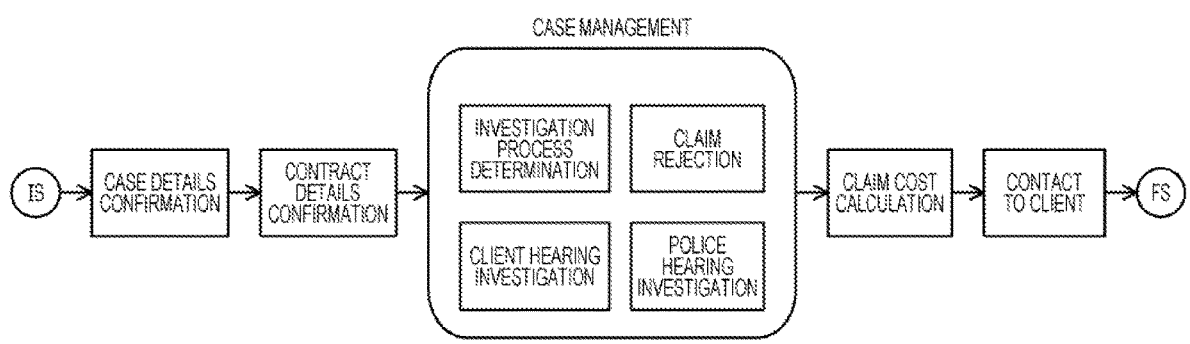
FIG. 2 is a diagram (part 1) illustrating an example of an operation flow.

An example of an operation flow diagram will be described with reference to an example of FIG. 2. In the example of FIG. 2, "Initial State (IS)" denotes a start of an operation flow. "Final State (FS)" denotes the end of the operation flow. The operation flow diagram of FIG. 2 is an operation flow diagram for an accident site investigation regarding an operation of an insurance claim payout.

In the operation flow diagram of FIG. 2, a confirmation of case details event is performed. Next, a confirmation of contract details event is performed. Next, some or all four events included in a case management operation are performed.

A case management operation includes a plurality of events, exclusion of which from an operation flow has to be suppressed. Respective events may be performed in any order in the case management operation.

Further, in some cases, some of the events included in a case management operation may not be performed. In generating an operation flow, however, all the events which have to be included in a case management operation are intended to be included in an operation flow.

In the example of FIG. 2, four events, which are an investigation process determination, a claim rejection, a client hearing investigation, and a police hearing investigation, are included in a case management operation.

After the case management operation, a claim cost calculation event is performed, and a client contact event is then performed. The operation flow of the example of FIG. 2 represents a flow of the events described above.

Figure 3A:
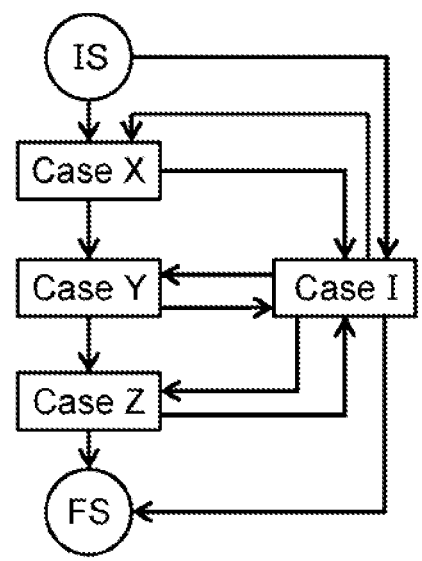
FIG. 3A is a diagram (part 2) illustrating an example of an operation flow.
Figure 3B:
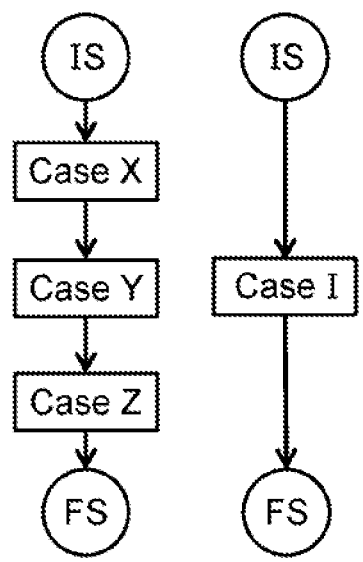
FIG. 3B is a diagram (part 3) illustrating an example of an operation flow.

FIG. 3A illustrates an example of an operation flow in which a parallel event is incorporated, and FIG. 3B illustrates an example of an operation flow in which no parallel event is incorporated. An operation flow diagram incorporating a parallel event therein will be described.

In the example of FIG. 3A, "Case X", "Case Y", "Case Z", and "Case I" denote respective events. "Case X", "Case Y", and "Case Z" form a primary path of an operation flow.

On the other hand, "Case I" is an event that is less relevant to the primary path. However, the fact that "Case I" is less frequent but has a transition relationship to "Case X", "Case Y", or "Case Z" is recorded as log data. This "Case I" may be called a parallel event.

In this case, generation of an operation flow indicating all the transition relationships among events would result in a complex operation flow because of overlapping of the three events described above included in the primary path and the parallel event.

As illustrated in the example of FIG. 3A, since the operation flow diagram incorporating the parallel event therein includes an expression of the transition relationship with respect to "Case I", which is less relevant to the primary path, the operation flow is complex. Thus, with respect to the event "Case I", it is preferable that the operation flow be generated as a path different from the primary path.

Thus, an event which is less relevant to the primary path is generated on a path different from the primary path by detecting an event whose frequency and probability regarding transitions of the events are less than or equal to a predetermined reference value and excluding the detected event from the primary path.

The example of FIG. 3B is an operation flow incorporating no parallel event therein, and the primary path and the event "Case I" are separated resulting in a simplified operation flow.

As the number of types of events recorded as log data is increased, incorporation of the parallel events into an operation flow results in a more complex operation flow. It is therefore preferable that an event which is less relevant to the primary path be generated on a path different from the primary path.

However, when detecting an event whose frequency and probability regarding transitions of the events are less than or equal to a predetermined reference value and excluding the detected event from the primary path, the event which has to be included in the case management operation described above is likely to be excluded, for example.

For example, each event included in the case management operation described above is a particular event which has to be included in the primary path, and it is therefore preferable that each event which has to be included in a case management operation not be excluded from an operation flow.

In the embodiment, a primary path and a path of a parallel event are separated in an operation flow, and no event included in a case management operation is excluded from a path.

Example of Log Data

FIG. 4 illustrates an example of log data. Log data is stored in the information processing system 2, and the acquisition unit 12 acquires log data from the information processing system 2. In the example of FIG. 4, log data includes identification (ID), timestamp, and event items.

An ID field is information identifying a path of a generated event. A timestamp field indicates the time of occurrence of an event. An event field is information indicating the type of a generated event field. In the embodiment, paths are generated for the in which events occur on an ID basis.

For example, in a case of ID "001", a path of the order of occurrence of "Case I", "Case A", "Case B" and so on is generated. For example, in a case of ID "002", a path of the order of occurrence of "Case A", "Case B", "Case I", and so on is generated.

Example of Path Data

FIG. 5 illustrates an example of path data generated in accordance with log data. The first identification unit 13 generates a plurality of paths in accordance with log data acquired by the acquisition unit 12. In the example of FIG. 5, "A", "B", and the like denote events ("Case" is omitted).

For example, in the example of FIG. 5, ""I", "A", "B", "C", "D", "E", "F", "G", and "H"" denote a path, and the number of paths generated in accordance with the log data is 100. Since a single path is generated in accordance with the order of occurrence of events associated with a single ID in the log data, 100 IDs which identify the paths described above are recorded in the log data.

When the order of occurrence of events is different, the first identification unit 13 generates a path of a different pattern. In the example of the case of FIG. 5, the first identification unit 13 identifies that the total number of paths for respective occurrence order patterns is 600. Data including generated paths and the number of paths is called path data. The first identification unit 13 stores path data in the storage unit 19.

Example of Inter-Event Transition Table

FIG. 6 is a table illustrating an example of the number of occurrences of transitions for each pair of a transition source event and a transition destination event (hereafter, referred to as an inter-event transition table). The first identification unit 13 identifies the number of occurrences of transitions for each pair described above based on path data and stores the inter-event transition table in the storage unit 19.

In the example of FIG. 6, "START" denotes a transition source event and "END" denotes a transition destination event. For example, the number of occurrences of transitions from a transition source event A to a transition destination event B is "500".

On the other hand, no information indicating a transition from event A to event C is recorded. Therefore, the number of occurrences of transitions from the transition source event A to the transition destination event B is "0".

Item "START $\Sigma$=T(END)" denotes the total number of occurrences of transitions from one transition source event to nine remaining events. Item "END $\Sigma$=T(START)" denotes the total number of occurrences of transitions to one transition source event from nine remaining events.

Example of Operation Flow Generation of the Embodiment

Figure 7:
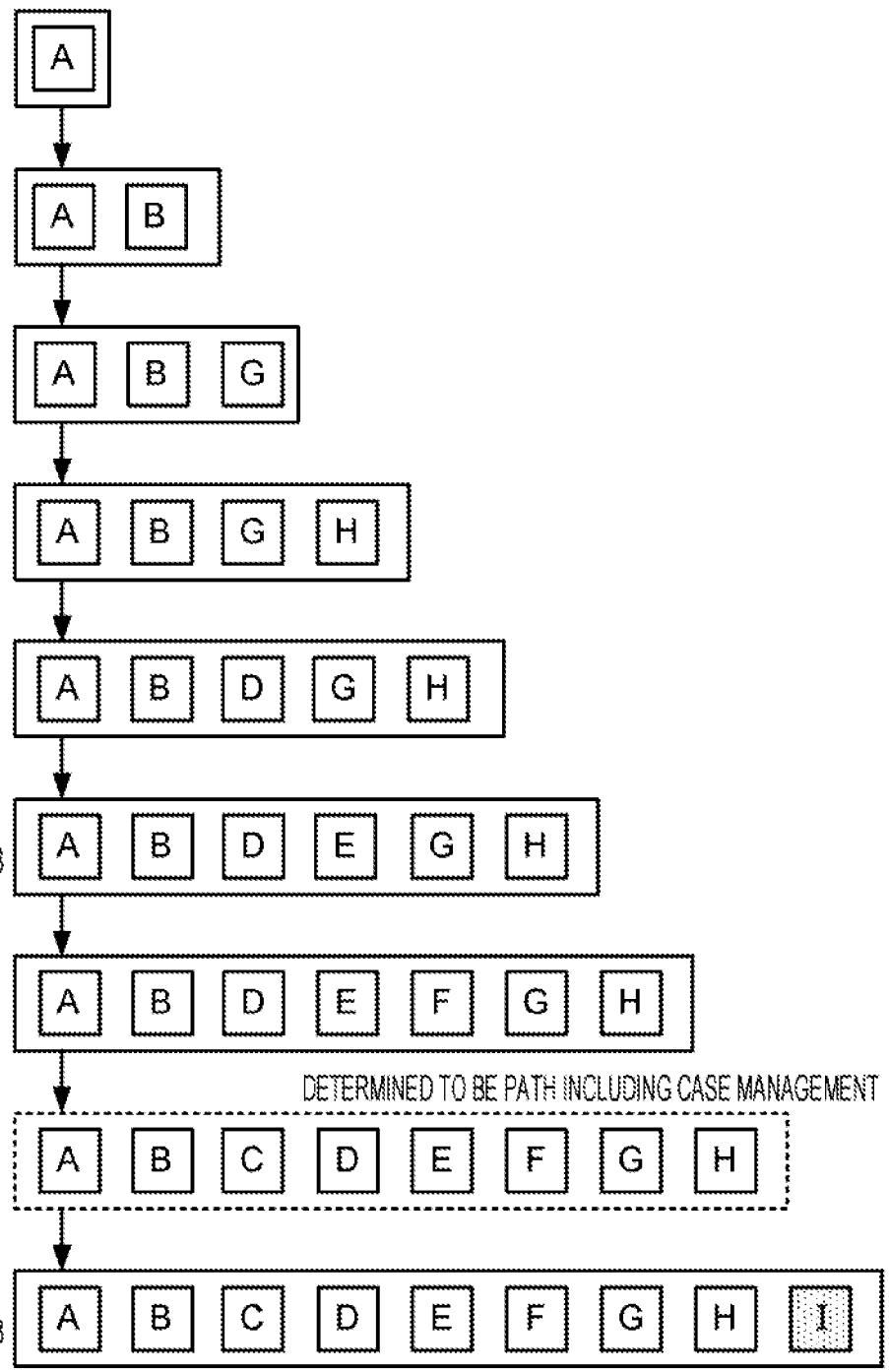
FIG. 7 is a diagram illustrating an example of a determination process of a path in the embodiment.

Next, an example of generation of an operation flow of the embodiment will be described with reference to FIG. 7. The second identification unit 14 refers to the inter-event transition table and path data for selecting and adding events one by one in descending order of the number of occurrences of transitions.

In the inter-event transition table, the number of occurrences of transitions from event A to event B (equal to 500) and the number of occurrences of transitions from event G to event H (equal to 500) are the largest. On the other hand, it is recorded in path data that the transition from event A to event B occurs before the transition from event G to event H.

First, the second identification unit 14 identifies a transition from event A to event B. As illustrated in the example of FIG. 7, the second identification unit 14 selects the transition source event A in a first step. Next, the second identification unit 14 selects the transition destination event B for the transition source event A. The transition source event A and the transition destination event B form a pair.

The transition of the next largest number of occurrences is the transition from event G to event H. The second identification unit 14 selects event G in a third step and adds the selected event G to an event group. In this case, three events are included in the event group.

Next, the second identification unit 14 selects event H at a fourth step and adds the selected event H to the event group. In this case, four events are included in the event group.

The second identification unit 14 refers to path data and detects that there are a plurality of events between the pair of event A and event B and the pair of event G and event H. Further, as described above, the transition from event A to event B occurs before the transition from event G to event H.

In this case, the second identification unit 14 selects an event having the largest number of occurrences of transitions from a plurality of transition destination events that have transitioned from event B, which is the transition source event of the pair of event A and event B.

When the transition source is event B, an event having the largest number of occurrences of transitions is event D (the number of occurrences is 310). The second identification unit 14 selects event D in a fifth step and adds event D to the event group. In this case, five events are included in the event group.

The second identification unit 14 refers to path data for detecting whether or not there are a plurality of patterns in the order of occurrence of events A, B, D, G, and H.

The order of occurrence of "A", "B", "D", "G", and "H" (hereafter, denoted as ABDGH) only is detected from the paths in path data. The second identification unit 14 identifies that the occurrence order pattern is one pattern "ABDGH" only and that the number of occurrences thereof is 600. Note that, in this case, while events other than A, B, D, G, and H may be included within the sequence of ABDGH, events A, B, D, G, and H only are the focus for detecting the order of occurrence of these events.

The calculation unit 15 calculates a Gini coefficient based on the number of occurrence order patterns and the number of occurrences thereof. A Gini coefficient is a value indicating the degree of imbalance (the degree of inequality) of the transition destinations of events. A Gini coefficient is a value corresponding to two times the area of region occluded by a line of perfect equality and a Lorenz curve. In the embodiment, while a Gini coefficient is used as a value indicating the degree of inequality, any value other than the Gini coefficient may be used as long as it indicates the degree of inequality.

A Gini coefficient is a value greater than "0" and less than "1" A Gini coefficient close to "1" indicates a large degree of imbalance.

The calculation unit 15 calculates that the Gini coefficient is "0.833333" based on the line of perfect equality and the Lorenz curve described above. In the fifth step, kurtosis is not calculated.

The second identification unit 14 refers to path data to detect an event having the largest number of occurrences of transitions when the transition source event is event D. The most frequent event is event E (number of occurrences is 320). The second identification unit 14 selects event E in a sixth step and adds event E to the event group. In this case, six events are included in the event group.

The second identification unit 14 refers to path data for detecting whether or not there are a plurality of patterns in the order of occurrence of events A, B, D, E, G, and H. The occurrence order patterns "ABDEGH" and "ABEDGH" are detected from the paths in path data.

The second identification unit 14 identifies that the number of occurrences for the occurrence order pattern "ABDEGH" is 480 and that the number of occurrences for the occurrence order pattern "ABEDGH" is 120. Since the number of occurrences of the former is greater, the occurrence order pattern "ABDEGH" is considered.

The calculation unit 15 calculates a Gini coefficient based on the number of occurrence order patterns and the number of occurrences thereof. The Gini coefficient for the event group to which event E is added is "0.8". The Gini coefficient in the sixth step is less than the Gini coefficient in the seventh step, indicating that the imbalance of the occurrence order patterns has decreased.

Further, the calculation unit 15 calculates kurtosis based on the number of occurrences for occurrence order patterns. Kurtosis represents a degree at which the distribution of the numbers of occurrences for occurrence order patterns concentrates at the average value. Kurtosis increases from a lower value, reaches the maximum, and then decreases. Higher kurtosis indicates that the transition between events are more characterized. In this case, the relevance between events is higher.

Kurtosis is calculated through a predetermined calculation based on a Pareto distribution (a continuous type probability distribution) expressed by a probability density function and a cumulative distribution function. Although kurtosis is used as a value that represents the degree of concentration to the average value in the distribution of the numbers of occurrences for occurrence order patterns in the embodiment, any value other than the kurtosis may be used as long as it indicates the degree of concentration as described above.

The calculation unit 15 calculates kurtosis based on two occurrence patterns and the number of occurrences for respective occurrence patterns. The kurtosis in the sixth step is "0.25". When the number of events is smaller, the characteristic is less likely to appear in transitions between events.

Therefore, the calculation unit 15 calculates the kurtosis when the number of events included in the event group reaches an event number threshold. In the example of FIG. 7, the calculation unit 15 calculates the kurtosis in response to the number of events included in the event group reaching "6". The event number threshold is an example of a second threshold.

Thus, since calculation of the kurtosis is not performed unless the number of events included in the event group reaches the event number threshold or greater, the amount of calculation performed by the calculation unit 15 can be reduced.

The second identification unit 14 refers to path data to detect an event having the largest number of occurrences of transitions when the transition source event is event E. The most frequent event is event F (the number of occurrences is 330).

The second identification unit 14 selects event F at a seventh step and adds event F to the event group. In this case, seven events are included in the event group.

The second identification unit 14 refers to path data to detect whether or not there are a plurality of patterns in the order of occurrence of events A, B, D, E, F, G, and H. Six occurrence order patterns are detected form the paths in path data.

The detected occurrence order patterns are "ABDEFGH", "ABDFEGH", "ABEDFGH", "ABEFDGH", "ABFDEGH", and "ABFEDGH". In these patterns, the number of occurrences associated with the occurrence order pattern "ABDEFGH" is 400, and the number of occurrences associated with each of the remaining five occurrence order patterns is 40. Therefore, the occurrence order pattern "ABDEFGH" having the largest number of occurrences is considered.

The calculation unit 15 calculates kurtosis and a Gini coefficient based on the above six occurrence order patterns and the number of occurrences for respective occurrence order patterns. The calculated kurtosis is "0.4125" and the Gini coefficient is "0.775".

The determination unit 16 compares the kurtosis of the current step (the seventh step) with the kurtosis of the previous step (the sixth step) and determines whether or not the kurtosis is decreasing. The kurtosis of the previous step is "0.25" and the kurtosis of the current step is "0.4125". Therefore, since the kurtosis has increased, the determination unit 16 determines that the kurtosis is not decreasing.

The second identification unit 14 refers to path data to detect an event having the largest number of occurrences of transitions when the transition source event is event F. The most frequent event is event C (the number of occurrences is 150).

The second identification unit 14 selects event C at an eighth step and adds event C to the event group. In this case, the number of events included in the event group is eight. Since the number of occurrences of the occurrence order pattern "ABCDEFGH" is the largest, this occurrence order pattern is considered.

The second identification unit 14 refers to path data to detect whether or not there are a plurality of patterns in the order of occurrence of events A, B, C, D, E, F, G, and H. Form the paths in path data, 24 occurrence order patterns are detected.

In the above patterns, there are four occurrence order patterns whose number of occurrences is 100, and there are 20 occurrence order patterns whose number of occurrences is 10.

The calculation unit 15 calculates kurtosis and a Gini coefficient based on the above 24 occurrence order patterns and the number of occurrences for respective occurrence order patterns. In this case, the kurtosis is "0.38825" and the Gini coefficient is "0.555556".

The determination unit 16 compares the kurtosis of the current step (the eighth step) with the kurtosis of the previous step (the seventh step) and determines whether or not the kurtosis is decreasing. The kurtosis of the previous step is "0.4125" and the kurtosis of the current step is "0.555556". Therefore, the determination unit 16 determines that the kurtosis is decreasing.

When determining that the kurtosis is decreasing, the determination unit 16 then determines whether the Gini coefficient in the current step (the eighth step) is greater than or equal to a Gini coefficient threshold. Although the Gini coefficient threshold is "0.5" in the embodiment, the Gini coefficient threshold may be any value other than "0.5". The Gini coefficient threshold is an example of a first threshold.

The Gini coefficient at the current step is "0.555556". Therefore, the determination unit 16 determines that the Gini coefficient is greater than the Gini coefficient threshold. In the embodiment, when determining that the Gini coefficient is greater than or equal to Gini coefficient threshold even when the kurtosis decreases, the determination unit 16 leaves the path of the added event C as a candidate.

Events A to I are recorded in path data, and events A to H have already been selected. Therefore, the second identification unit 14 detects the remaining one event I. The second identification unit 14 selects event I at a ninth step and adds event I to the event group. In this case, nine events are included in the event group.

The second identification unit 14 refers to path data to detect whether or not there are a pattern in the order of occurrence of events A, B, C, D, E, F, G, H, and I. Form the paths in path data, 24 occurrence order patterns are detected.

In the above patterns, there are four occurrence order patterns whose number of occurrences is 100, and there are 20 occurrence order patterns whose number of occurrences is 10.

The calculation unit 15 calculates kurtosis and a Gini coefficient based on the above 24 occurrence order patterns and the number of occurrences for respective occurrence order patterns. In this case, the kurtosis is "0.38825" and the Gini coefficient is "0.3".

The determination unit 16 determines whether or not the Gini coefficient in the current step (the ninth step) is greater than or equal to the Gini coefficient threshold. The current Gini coefficient is "0.3", which is less than the Gini coefficient threshold (equal to 0.5). Therefore, the determination unit 16 determines that the current Gini coefficient is less than the Gini coefficient threshold.

At this step, the determination unit 16 determines that the kurtosis decreases and the current Gini coefficient is less than the Gini coefficient threshold. In this case, the determination unit 16 determines, as a path including a case management operation, a path formed of the events included in the event group in the previous step (the eighth step) that is immediately before the current step.

Therefore, since the path formed of the events included in the event group in the eighth step is determined to be a path including the case management operation, the path formed of event I added in the ninth step, is not, determined to be a path including the case management operation.

That is, event I is determined to be a parallel event. This allows for separation of the path of events A to H (the path including events C to F included in the case management operation) from the path of event I.

The Gini coefficient indicates the degree of inequality as described above. In the eighth step, even when event C is added to the event group, the Gini coefficient is greater than or equal to the Gini coefficient threshold. This indicates that there is imbalance in the transition destination events from event C.

Since the events included in a case management operation are likely to transition in a limited manner within the range of the case management operation, the fact that the Gini coefficient is high when event C is added to the event group indicates that event C is likely to be included in the case management operation.

Therefore, the determination unit 16 determines that event C is likely to be included in the case management operation in the eighth step and does not exclude event C from the path including the case management operation.

On the other hand, with addition of event I in the ninth step, the Gini coefficient will be less than the Gini coefficient threshold. In this case, since no imbalance occurs in the transition destination events from event I, the determination unit 16 may determine that event I is less likely to be included in the case management operation and exclude event I from the path including the case management operation.

Further, in the sixth and subsequent steps, the determination unit, 16 calculates the kurtosis every time an event is added to the event group. Since a higher kurtosis indicates a higher relevance between events, the kurtosis decreases every time an event is added to the event group.

In order that an event which has to be included in the case management operation is not excluded from a path including the case management operation, it is preferable that the number of events included in an event group be larger.

Thus, the determination unit 16 does not determine a path including the case management operation as long as the Gini coefficient is greater than the Gini coefficient threshold even when the kurtosis decreases every time an event is added to an event group.

The determination unit 16 then determines, as a path including the case management operation, an event group obtained when the Gini coefficient becomes less the Gini coefficient threshold. That is, the determination unit 16 determines that, in the sixth and subsequent steps, a path formed of events included in an event group at a step where the Gini coefficient is greater than or equal to the Gini coefficient threshold and the kurtosis is the lowest is the path including the case management operation.

Further, since the determination unit 16 determines that a path formed of events included in an event group at a step where the Gini coefficient is within a range greater than or equal to the Gini coefficient threshold and the kurtosis is the lowest is the path including the case management operation, the kurtosis at this step is expected to be high to some degrees.

Thus, paths can be obtained such that a path formed of events A to H having a higher relevance between the events is separated from a path formed of event I having a lower relevance between the events. This allows for a simplified operation flow.

The flow generating unit 17 generates an operation flow in which the path formed of events A to H is separated from the path formed of event I.

It is indicated that all the paths in path data from which event I is excluded start with event A, and event B is then performed.

Further, it is indicated that all the paths are complete after event G is performed and event H is then performed. There are a plurality of occurrence order patterns for events C, D, E, and F present between events B and G.

Figure 8:
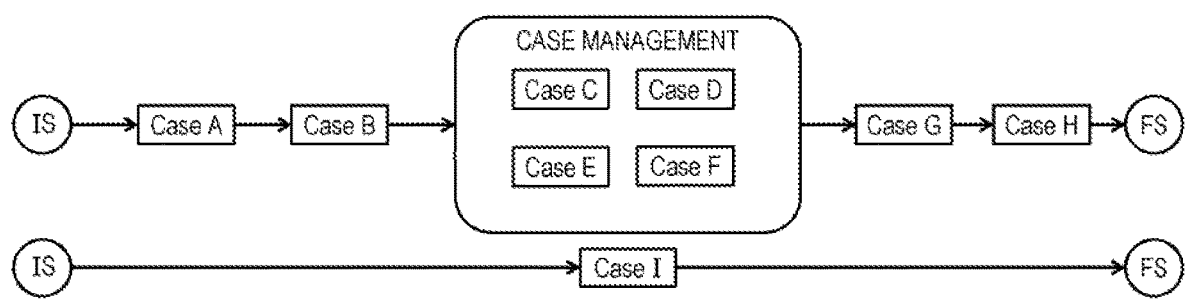
FIG. 8 is a diagram (part 4) illustrating an example of an operation flow.

As illustrated in the example of FIG. 8, the, flow generating unit 17 generates a path in which events included in the case management operation are events C, D, E, and F and generates another path (a path for event I only) that is different from the above path.

The flow generating unit 17 creates an operation flow diagram for visualizing an operation flow. For example, the flow generating unit 17 creates an operation flow diagram as illustrated in FIG. 8. The display control unit 18 displays the created operation flow diagram on the display 20.

Comparative Example

Figure 9:
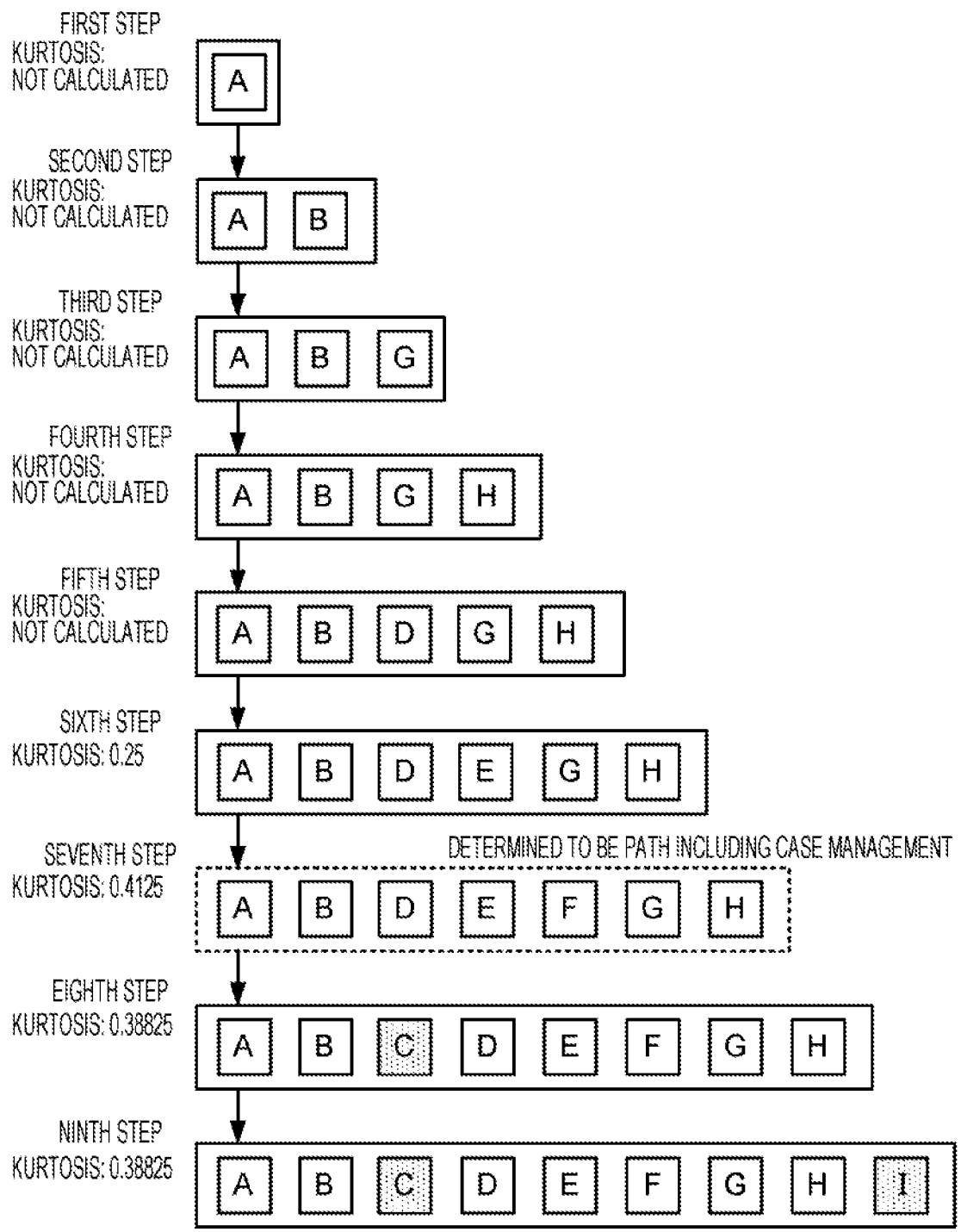
FIG. 9 is a diagram illustrating an example of a determination process for a path in a comparative example.

Next, a comparative example will be described. FIG. 9 illustrates an example of a case of determining a path including a case management operation based only on kurtosis. When a path including a case management operation is determined based only on the kurtosis, a path formed of events included in an event group obtained when the kurtosis turns from an increase to a decrease may be determined to be a path including the case management operation.

In this case, a path formed of the events included in an event group in the seventh step is determined to be a path including the case management operation. Event C is not included in the event group in the seventh step.

Therefore, the flow generating unit 17 generates a path on which event C and event I are excluded from the events included in the event group in the seventh step, a path formed of only event C, and a path formed of only event I, respectively.

Figure 10:
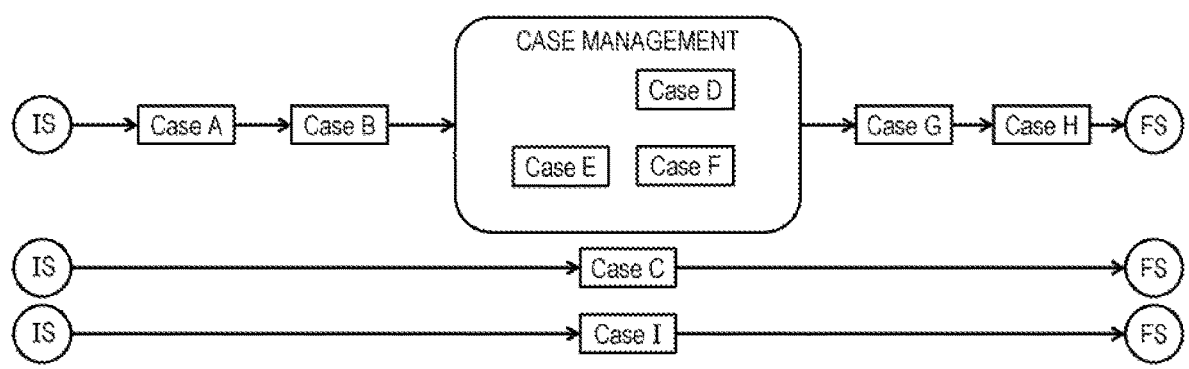
FIG. 10 is a diagram (part 5) illustrating an example of an operation flow.

Thereby, an operation flow diagram as illustrated in FIG. 10 is created. In the example of FIG. 10, event C which has to be included in the case management operation is excluded, This is because the operation flow is generated based on the kurtosis only.

On the other hand, since a path is determined by events included in an event group based on kurtosis and a Gini coefficient in the embodiment as described above, all the events which have to be included, in the case management operation are included in the pall This can reduce such a case that the event which has to be included in a case management operation is excluded from the case management operation.

Another Example of Operation Flow Generation of the Embodiment

Next, another example of operation flow generation of the embodiment will be described. FIG. 11 illustrates an example of path data in another example and the kurtosis and the Gini coefficient at each step. Occurrence order patterns identified based on the path data and the number of occurrences of transitions for the occurrence order patterns are identified.

The calculation unit 15 calculates a Gini coefficient and kurtosis at each step. In the case of the example of FIG. 11, of the event groups whose Gini coefficient is greater than or equal to the Gini coefficient threshold (equal to 0.5), the event group having the lowest kurtosis is obtained in the fourth step.

Figure 12:
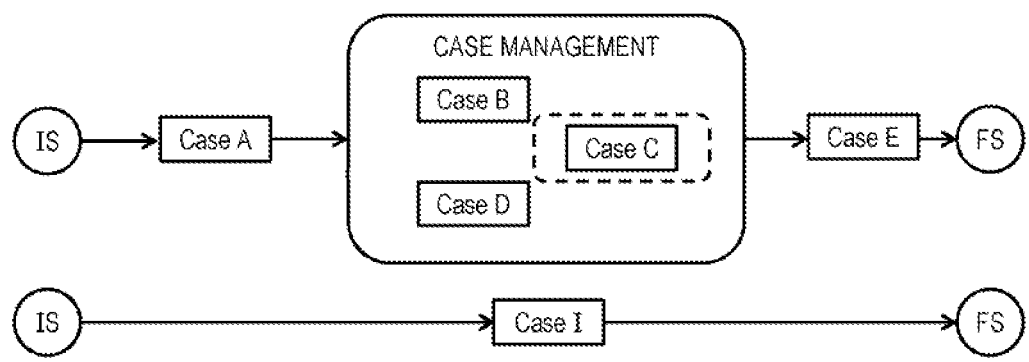
FIG. 12 is a diagram (part 6) illustrating an example of an operation flow.

As illustrated in the example of FIG. 11, event C is less frequently performed than other events. However, since the event which has to be included in a path is identified based on the kurtosis and the Gini coefficient, the flow generating unit 17 generates a path on which event C is included in the case management operation as illustrated in the example of FIG. 12.

Further, since event I has a low relevance to events A to E, an operation flow of event I is generated as another path that is different from a path of events A to E. This reduces such a case that an event which has to be included in a case management operation is not included in the case management operation, and suppresses an operation flow diagram from being complex.

Flowchart of the Embodiment

Figure 13:
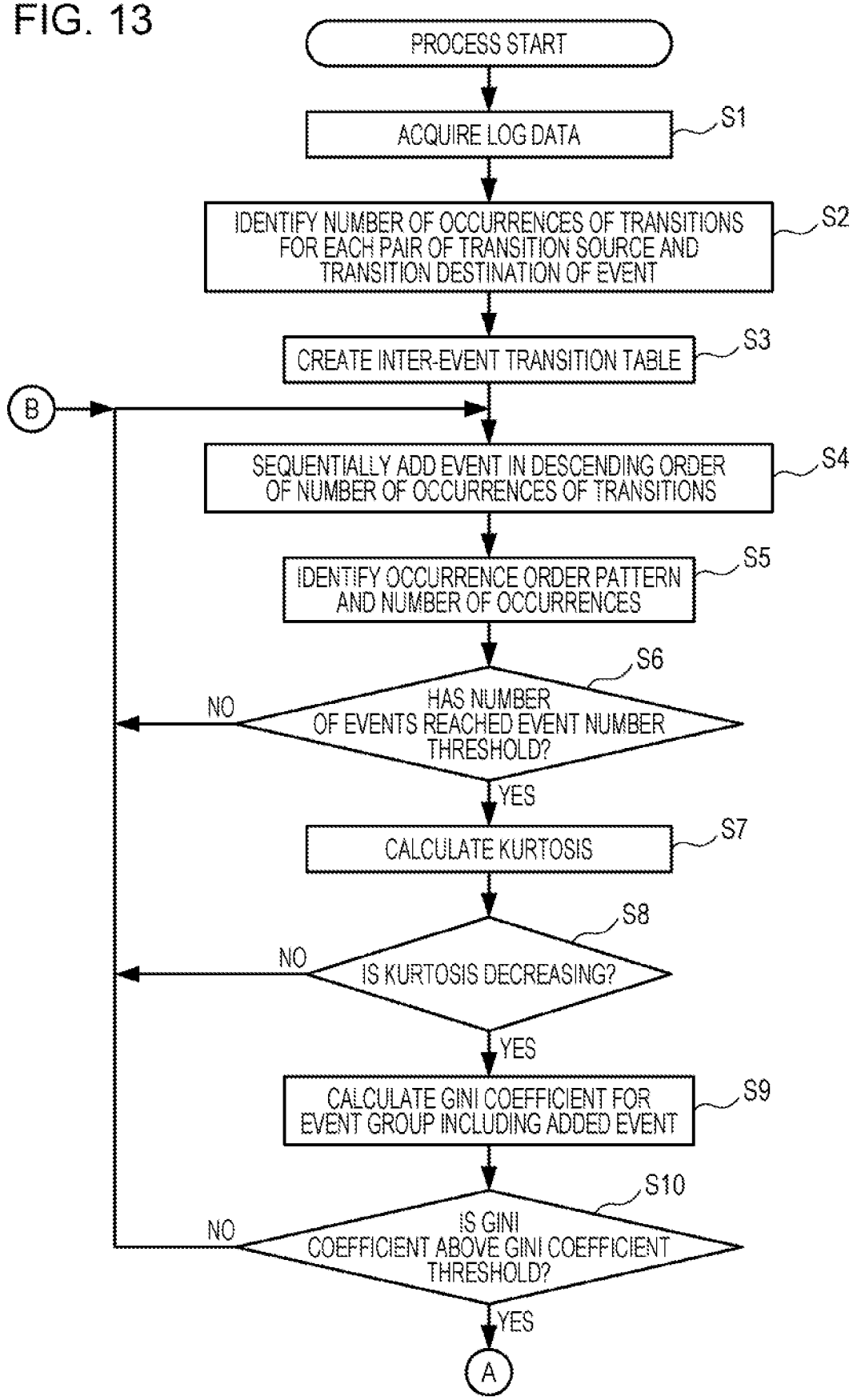
FIG. 13 is a flowchart (part 1) illustrating an, example of a process flow of the embodiment.
Figure 14:
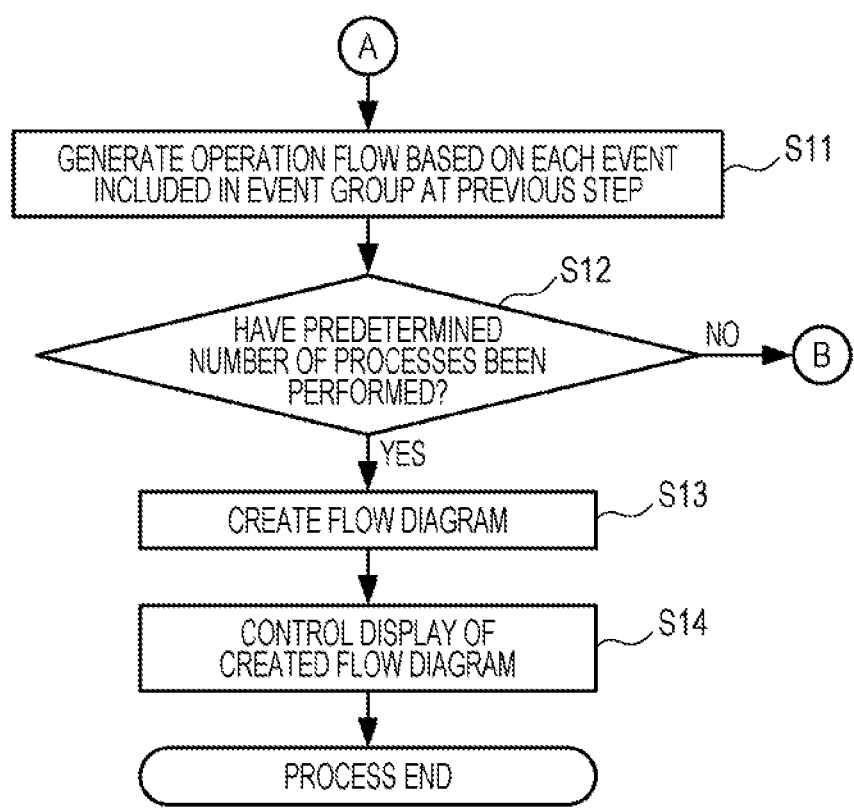
FIG. 14 is a flowchart (part 2) illustrating an example of a process flow of the embodiment.

Next, an example of a process flow of the embodiment will be described with reference to flowcharts of FIG. 13 and FIG. 14. The acquisition unit 12 acquires log data from the information processing system 2 (step S1). The acquired log data is stored in the storage unit 19.

The first identification unit 13 identifies the number of occurrences of transitions for each pair of a transition source event and a transition destination event based on the acquired log data (step S2). The first identification unit 13 creates an inter-event transition table based on the identified number of occurrences of transitions (step S3) and stores the created inter-event transition table in the storage unit 19.

The second identification unit 14 sequentially increments an event group in descending order of the number of occurrences of transitions based on the inter-event transition table (step S4). The second identification unit 14 then identifies occurrence order patterns and the number of occurrences of transitions for each of the occurrence order patterns (step 55).

The second identification unit 14 determines whether or not the number of events included in the event group to which an event has been added reaches an event number threshold (step S6). If NO is determined at step S6, the process returns to step S4.

If YES is determined at step S6, the calculation unit 15 calculates kurtosis based on the occurrence order pattern of the events included in the event group (step S7). The determination unit 16 determines whether or not the kurtosis is decreasing (step S8). If NO is determined at step S8, the process returns to step S4.

If YES is determined at step S8, the calculation unit 15 calculates a Gini coefficient based on the number of occurrences for the occurrence order patterns of the events included in the incremented event group (step S9). The determination unit 16 determines whether or not the calculated Gini coefficient is greater than or equal to a Gini coefficient threshold (step S10). If NO is determined at step S10, the process returns to step S4.

If YES is determined at step S10, the process proceeds to "A". The process on and after "A" will, be described with reference to the flowchart of FIG. 14. If the calculated Gini coefficient is determined to be greater than or equal to the Gini coefficient threshold, the flow generating unit 17 generates an operation flow that is based on the events included in the event group obtained in the previous step (step S11).

The main control unit 11 determines whether or not the process from step S4 to step S11 has been performed predetermined times (step S12). The predetermined number may be set to any number. If NO is determined at step S12, the process returns to step S4 from "B".

If YES is determined at step S12, the flow generating unit 17 creates an operation flow diagram for visualizing the generated operation flow (step S13). The display control unit 18 then controls to display the created operation flow diagram on the display 20 (step S14). The process then ends.

Example of Flow Generating Device and Hardware Configuration

Figure 15:
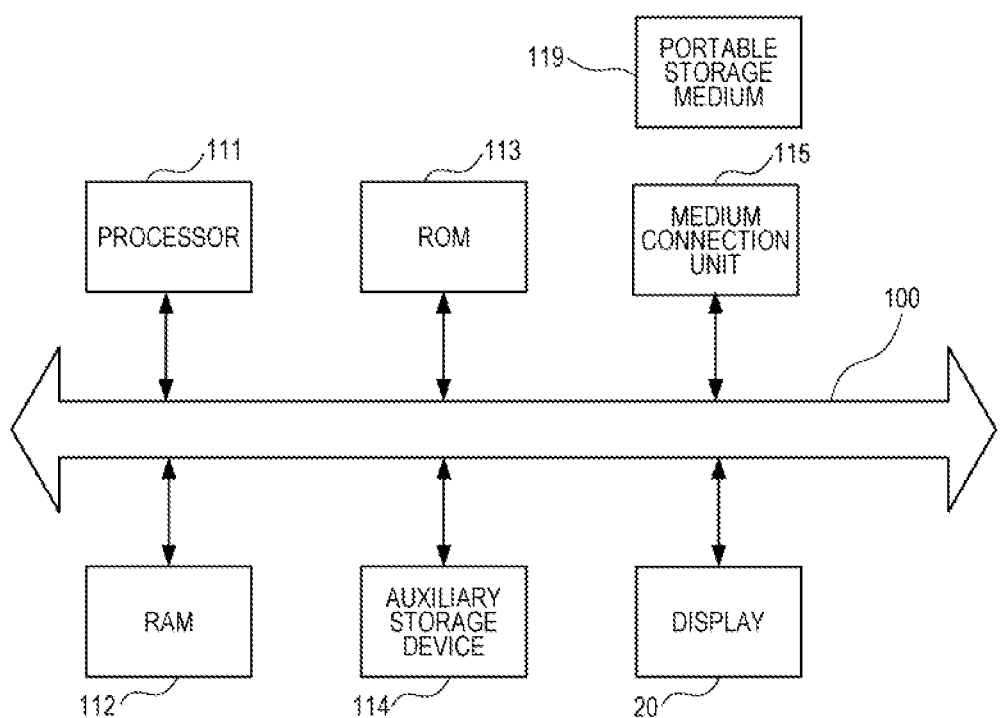
FIG. 15 is a diagram illustrating an example of a hardware configuration of flow generating device.

Next, an example of a hardware configuration of the flow generating device 3 will be described with reference to an example of FIG. 15. As illustrated in the example of FIG. 15, a processor 111, a Random Access Memory (RAM) 112, and a Read Only Memory (ROM) 113 are connected to a bus 100. Further, an auxiliary storage device 114, a medium connection unit 115, and the display 20 are connected to the bus 100.

The processor 111 executes a program extended to the RAM 112. A flow generating program for performing the process of the embodiment is applied as the executed program.

The ROM 113 is a non-volatile storage device that stores a program extended to the RAM 112. The auxiliary storage device 114 is a storage device that stores various information therein, and a hard disc drive, a semiconductor memory, or the like may be applied to the auxiliary storage device 114, for example. The medium connection unit 115 is provided in a connectable manner with a portable storage medium 118.

For the portable storage medium 118, a portable memory device, an optical disc (for example, a compact disc (CD), a digital versatile disc (DVD), a semiconductor memory, or the like), or the like may be employed. The flow generating program for performing the process of the embodiment may be stored in the portable storage medium 118.

The storage unit 19 may be implemented by using the RAM 112, the auxiliary storage device 114, or the like. The main control unit 11, the acquisition unit 12, the first identification unit 13, the second identification unit 14, the calculation unit 15, the determination unit 16, the flow generating unit 17, and the display control unit 18 may be implemented by the processor 111 executing a given flow generating program.

Each of the RAM 112, the ROM 113, the auxiliary storage device 114, and the portable storage medium 118 is an example of a tangible, computer readable storage media. These tangible storage media are not a transitory medium such as a signal carrier.

Embodiments are not limited to the embodiments described above and can take various configurations or implementations within the scope not departing from the spirit of the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium that stores a flow generating program for causing a computer to execute processes of:

first identifying, from information of a plurality of occurrence events recorded as log data of an information processing system, numbers of occurrences of transitions for respective pairs of a transition source occurrence event and a transition destination occurrence event;

second identifying, based on the identified numbers of occurrences of transitions, occurrence order patterns and numbers of occurrences for the respective occurrence order patterns, for each of a plurality of occurrence event groups which includes two or more pairs selected in a descending order of the number of occurrences and has a different number of the occurrence events;

calculating a degree of concentration and a degree of inequality to an average value of a distribution of the numbers of occurrences for the respective identified occurrence order patterns;

generating a flow of the occurrence events based on an occurrence event group in which the degree of inequality is greater than or equal to a first threshold and the degree of concentration is the lowest;

creating a flow diagram for visualizing the generated flow of the occurrence events; and displaying the created flow diagram on a display.

2. The storage medium that stores the flow generating program according to claim 1 for causing the computer to further execute processes of:

first determining whether or not the degree of concentration decreases every time an occurrence event is added to the occurrence event group;

second determining, when the degree of concentration is determined decreasing, whether or not the degree of inequality decreases every time the occurrence event is added to the occurrence event group; and generating the flow of the occurrence events based on the occurrence event group obtained when the degree of inequality is greater than or equal to the first threshold.

3. The storage medium that stores the flow generating program according to claim 2:

wherein the process of the calculating the degree of concentration is performed after the number of occurrence events included in the occurrence event group exceeds a second threshold.

4. The storage medium that stores the flow generating program according to claim 2 for causing the computer to further execute a process of:

adding the transition destination occurrence event to the occurrence event group in a descending order of a transition destination occurrence event in a pair having the largest number of occurrences of transitions.

5. A flow generating method for causing a computer to execute processes of:

first identifying, from information of a plurality of occurrence events recorded as log data of an information processing system, numbers of occurrences of transitions for respective pairs of a transition source occurrence event and a transition destination occurrence event;

second identifying, based on the identified numbers of occurrences of transitions, occurrence order patterns and numbers of occurrences for the respective occurrence order patterns, for each of a plurality of occurrence event groups which includes two or more pairs selected in a descending order of the number of occurrences and has a different number of the occurrence events;

calculating a degree of concentration and a degree of inequality to an average value of a distribution of the numbers of occurrences for the respective identified occurrence order patterns;

generating a flow of the occurrence events based on an occurrence event group in which the degree of inequality is greater than or equal to a first threshold and the degree of concentration is the lowest;

creating a flow diagram for visualizing the generated flow of the occurrence events; and displaying the created flow diagram on a display.

6. A flow generating device comprising:

a memory;

a display; and a processor coupled to the memory and configured to execute:

first identifying, from information of a plurality of occurrence events recorded as log data of an information processing system, numbers of occurrences of transitions for respective pairs of a transition source occurrence event and a transition destination occurrence event;

second identifying, based on the identified numbers of occurrences of transitions, occurrence order patterns and the numbers of occurrences for the respective occurrence order patterns, for each of a plurality of occurrence event groups which includes two or more pairs selected in a descending order of the number of occurrences and has a different number of the occurrence events;

calculating a degree of concentration and a degree of inequality to an average value of a distribution of the numbers of occurrences for the respective identified occurrence order patterns;

generating a flow of the occurrence events based on an occurrence event group in which the degree of inequality is greater than or equal to a first threshold and the degree of concentration is the lowest;

creating a flow diagram for visualizing the generated flow of the occurrence events; and displaying the created flow diagram on the display.

* * * * *